US012712777B2

(12) United States Patent
Gupta et al.

(10) Patent No.: US 12,712,777 B2
(45) Date of Patent: Aug. 18, 2026

(54) SYSTEM AND METHOD FOR TRANSFORMING NETWORK DATA PACKETS INTO PIXELS FOR PATTERN ANALYSIS

(71) Applicant: Bank of America Corporation, Charlotte, NC (US)

(72) Inventors: Saurabh Gupta, New Delhi (IN); Amit Bhandari, Uttarakhand (IN); Neetu Kalra, Haryana (IN); Angel, Himachal Pradesh (IN); Riya Sharma, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 19/019,897

(22) Filed: Jan. 14, 2025

(65) Prior Publication Data

US 2026/0205347 A1 Jul. 16, 2026

(51) Int. Cl.

*H04L 41/06* (2022.01)
*G06T 7/00* (2017.01)
*G06T 7/90* (2017.01)
*G06T 11/10* (2026.01)
*H04L 69/04* (2022.01)

(52) U.S. Cl.

CPC ............ *H04L 41/06* (2013.01); *G06T 7/0002* (2013.01); *G06T 7/90* (2017.01); *G06T 11/10* (2026.01); *H04L 69/04* (2013.01); *G06T 2207/10024* (2013.01); *G06T 2207/20081* (2013.01); *G06T 2207/20084* (2013.01); *G06T 2210/32* (2013.01)

(58) Field of Classification Search

CPC ....... H04L 41/06; H04L 69/04; G06T 7/0002; G06T 7/90; G06T 11/10; G06T 2207/10024; G06T 2207/20081; G06T 2207/20084; G06T 2210/32

See application file for complete search history.

(56) References Cited

U.S. PATENT DOCUMENTS

| | | | |
|---|---|---|---|
| 8,725,667 | B2 | 5/2014 | Kaushal et al. |
| 9,424,528 | B2 | 8/2016 | Kaushal et al. |
| 9,476,730 | B2 | 10/2016 | Samarasekera et al. |
| 9,593,982 | B2 | 3/2017 | Rhoads et al. |
| 9,613,439 | B1 | 4/2017 | Raj |
| 10,113,910 | B2 | 10/2018 | Brunk et al. |
| 10,719,744 | B2 | 7/2020 | Smith et al. |
| 11,210,537 | B2 | 12/2021 | Koivisto et al. |
| 11,669,976 | B2 | 6/2023 | Datta et al. |
| 11,775,902 | B2 | 10/2023 | Baek et al. |
| 11,983,874 | B1 | 5/2024 | Dodle et al. |

(Continued)

*Primary Examiner* — Benjamin M Thieu

(57) ABSTRACT

A system for transforming data packets into pixels is disclosed. The system encodes each data packet into a respective encoded value, where each encoded value represents a unique transformation of a respective data packet. The system identifies data patterns within the data packets, where each data pattern indicates a respective data packet type. The system compresses each group of data packets that share a data pattern into a compressed format. The system determines a set of pixel attributes for each encoded, compressed data packet based on data packet attributes. The set of pixel attributes include a pixel color, a pixel color intensity, and a pixel location. The system generates an image comprising pixels based on the sets of pixel attributes.

20 Claims, 3 Drawing Sheets

(56) References Cited

U.S. PATENT DOCUMENTS

| | | | | |
|---|---|---|---|---|
| 12,028,549 | B1 | 7/2024 | Wang et al. | |
| 2003/0090702 | A1* | 5/2003 | Trelewicz | G06K 15/1814 358/1.15 |
| 2020/0007150 | A1* | 1/2020 | Lacey | H04N 19/176 |
| 2020/0007152 | A1* | 1/2020 | Fenney | H03M 7/3059 |
| 2021/0287451 | A1 | 9/2021 | Baudisch | |
| 2022/0172369 | A1 | 6/2022 | Tang et al. | |
| 2022/0239949 | A1 | 7/2022 | Hannuksela | |
| 2023/0103910 | A1 | 4/2023 | Ong et al. | |
| 2023/0114468 | A1 | 4/2023 | Strong et al. | |
| 2024/0013564 | A1 | 1/2024 | Kim et al. | |
| 2024/0071064 | A1 | 2/2024 | Chung et al. | |
| 2024/0121387 | A1* | 4/2024 | Lainema | H04N 19/117 |
| 2026/0073407 | A1* | 3/2026 | Peters | G06Q 30/018 |

* cited by examiner

SYSTEM AND METHOD FOR TRANSFORMING NETWORK DATA PACKETS INTO PIXELS FOR PATTERN ANALYSIS

TECHNICAL FIELD

The present disclosure relates generally to image generation, and more specifically to a system and method for transforming network data packets into pixels for pattern analysis.

BACKGROUND

Data encoding and compression methods may be used to encode and compress data. Drawing meaningful insight from network data packets, such as patterns or trends has become more challenging.

SUMMARY

The disclosed system, described in the present disclosure, is particularly integrated into practical applications to provide technological improvements to conventional techniques for network data packet pattern analysis and data packet anomaly and mitigation techniques.

Conventional systems typically store and analyze the raw format of network data packets. The analysis and storage of the network data packets in raw format consumes a lot of computational and memory resources and therefore are inefficient in terms of computational resource utilization and memory resource utilization. Further, analyzing the raw format of network data packets using legacy conventional algorithms is not sufficient to derive and extract meaningful insight from the analysis, at least because data patterns and trends within and among the data packets may be lost to the legacy conventional algorithms, for example, due to the increased complexity in the content of data packets. Further, conventional systems are unable to detect data patterns and trends across different data packet types (e.g., different data structures or schema) or to provide meaningful insight from the data packets for anomaly detection and mitigation. For example, if some data packets include content with different data schemas, such as extensible markup language (XML) and JavaScript object notation (JSON), conventional systems are not configured to compare such different formats with each other to draw correlations or patterns.

The disclosed system is configured to provide a technical solution to these and other technical problems in network communication pattern analysis, and data packet anomaly detection and mitigation techniques. The technical advantages and improvements over the conventional techniques are described below in conjunction with certain embodiments of the disclosed system.

In some embodiments, the disclosed system implements an unconventional method for data packet representation and analysis by encoding, compressing, and transforming the data packets into image pixels that visually represent the data packets. In some embodiments, the disclosed system is configured to implement an unconventional encoding algorithm that is configured to dynamically encode the data packets by adjusting the encoding parameters based on the attributes of the network data packet. For example, the encoding parameters may depend on the attributes, including, but not limited to, data structure, size, type, geographic location, time of communication in a network, and other attributes of the data packets. Therefore, the disclosed system implements a dynamic encoding process configured for each group of network data packets that share one or more common attributes, unlike conventional encoding systems where a one-size-fit-all encoding process is used and therefore is rigid and not flexible. Some of the technical advantages of the dynamic encoding process include implementing an attribute-specific encoding process that maintains relevant information of the data packets which would be lost if a fixed encoding process were applied to all data packets with different attributes. For example, using the attribute-specific encoding process, the key-value pairs in the JSON data packets, and tags and elements of the XML data packets are captured and encoded according to their respective attributes.

In some embodiments, the disclosed system is configured to implement an unconventional compressing algorithm that is configured to recursively identify repeating structures within the network data packets and replace each identified repeating structure with a corresponding compressed representation. Further, the depth of the recursive process to identify repeating structures within a given repeating structure is controlled by a dynamic threshold which determines the level of granularity for identifying and compressing repeating structures. The dynamic threshold is adjusted based on the desired tradeoff between compression ratio and maintaining details in the compressed data packets. For example, a higher dynamic threshold may lead to a higher compression ratio, where some detail may be lost, and a lower dynamic threshold may lead to a lower compression ratio and save more detail in the data packets.

In some embodiments, the disclosed system is configured to generate an image with pixels, where each pixel is a visual representation of a respective encoded, compressed data packet. The disclosed system may extract or derive meaningful insight from the image, such as the trends in various portions of the image, whether there are any outlier or anomalous pixels (and thus anomalous network packet), among others. For example, if a pixel representing a network packet does not have the same or substantially similar color or color intensity compared to its adjacent pixels, it may be an indication that the corresponding network packet is anomalous. In response, the disclosed system may mitigate the anomalous data packet by performing countermeasure actions, such as appending the data packet with an additional header field indicating anomalous and communicating an alert message that indicates that the data packet is anomalous, among others.

Accordingly, the disclosed system provides the practical applications of improving data packet pattern representation and analysis by encoding, compressing, and transforming the data packets into image pixels that visually represent the data packets. In some embodiments, a system comprises a network interface operably coupled with a processor. The network interface is configured to receive a plurality of data packets, wherein each data packet is associated with a set of data packet attributes comprising at least one of a type, content, or a timestamp of communication in a network. The processor is configured to encode each data packet from among the plurality of data packets into a respective encoded value, wherein a given encoded value represents a unique transformation of a respective data packet. The processor is further configured to identify a plurality of data patterns within the plurality of encoded data packets, wherein each data pattern indicates a respective data packet type. The processor is further configured to compress each group of encoded data packets that share a data pattern into a compressed format. The processor is further configured to determine a set of pixel attributes for a pixel for each encoded, compressed data packet, based, at least in part, upon the set of data packet attributes. The set of pixel attributes comprises a pixel color, a pixel color intensity, and a pixel position. The pixel color is associated with the type of a respective encoded, compressed data packet. The pixel color intensity is associated with a value of the content within the respective encoded, compressed data packet. The pixel location is associated with the timestamp of communication of the respective encoded, compressed data packet. The processor is further configured to generate, based, at least in part, upon the set of pixel attributes, an image comprising a plurality of pixels. Each pixel indicates a given encoded, compressed data packet. The image visually represents a trend of the plurality of data packets with respect to time.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
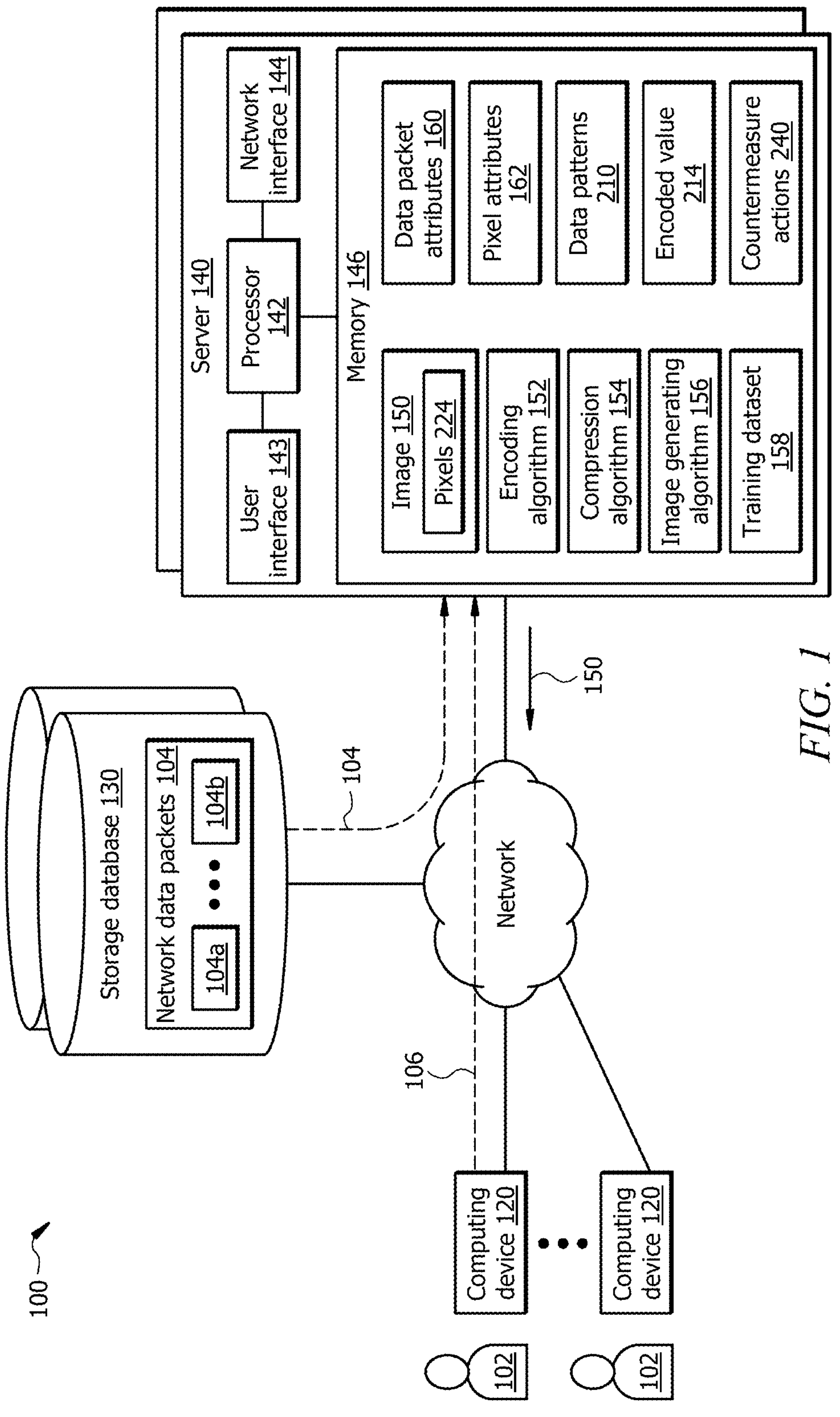
FIG. 1 illustrates an embodiment of a system configured to transform network data packets into pixels for pattern analysis and data packet anomaly detection and mitigation.
Figure 2:
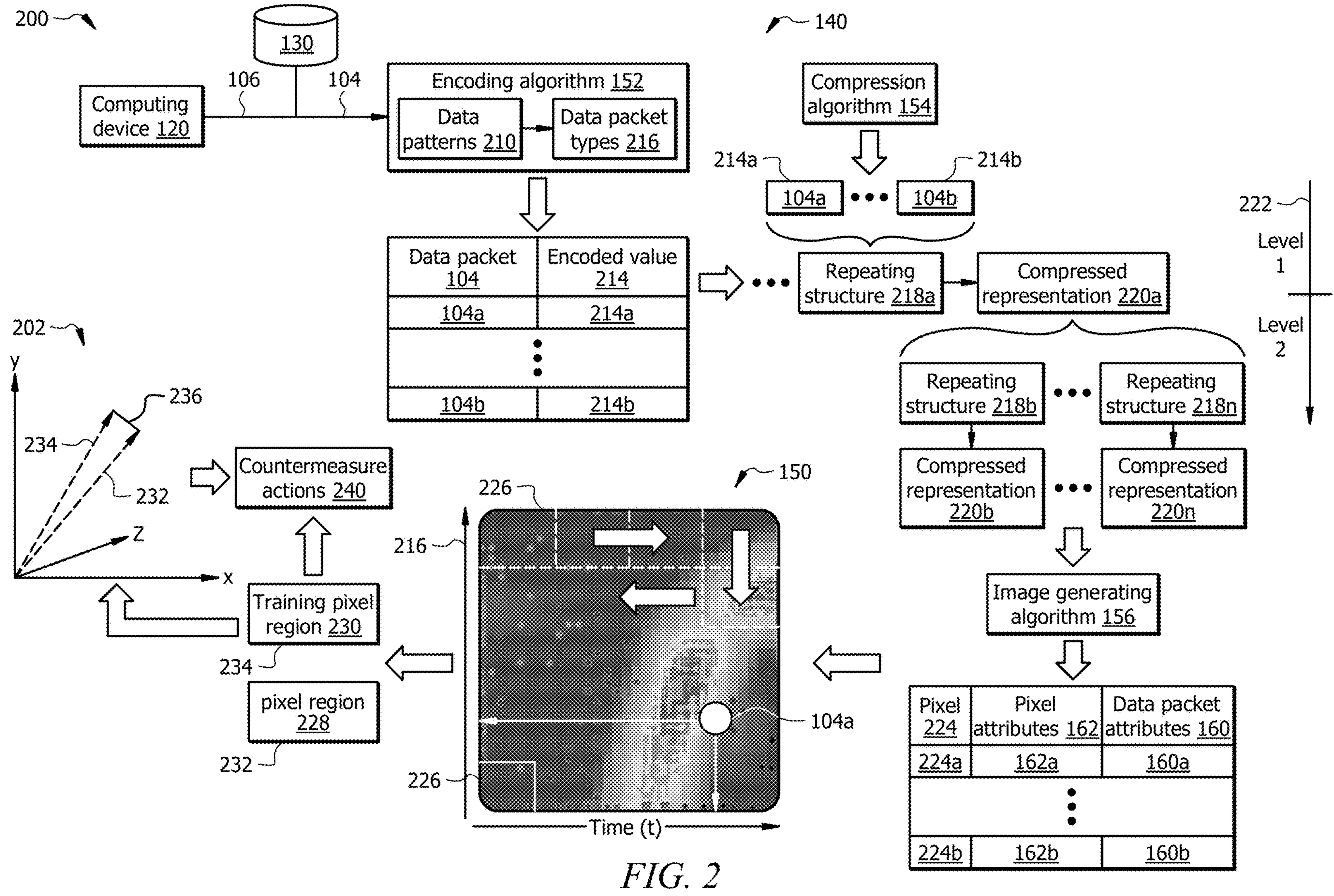
FIG. 2 illustrates an example operational flow of the system of FIG. 1 to transform network data packets into pixels for pattern analysis and data packet anomaly detection and mitigation.
Figure 3:
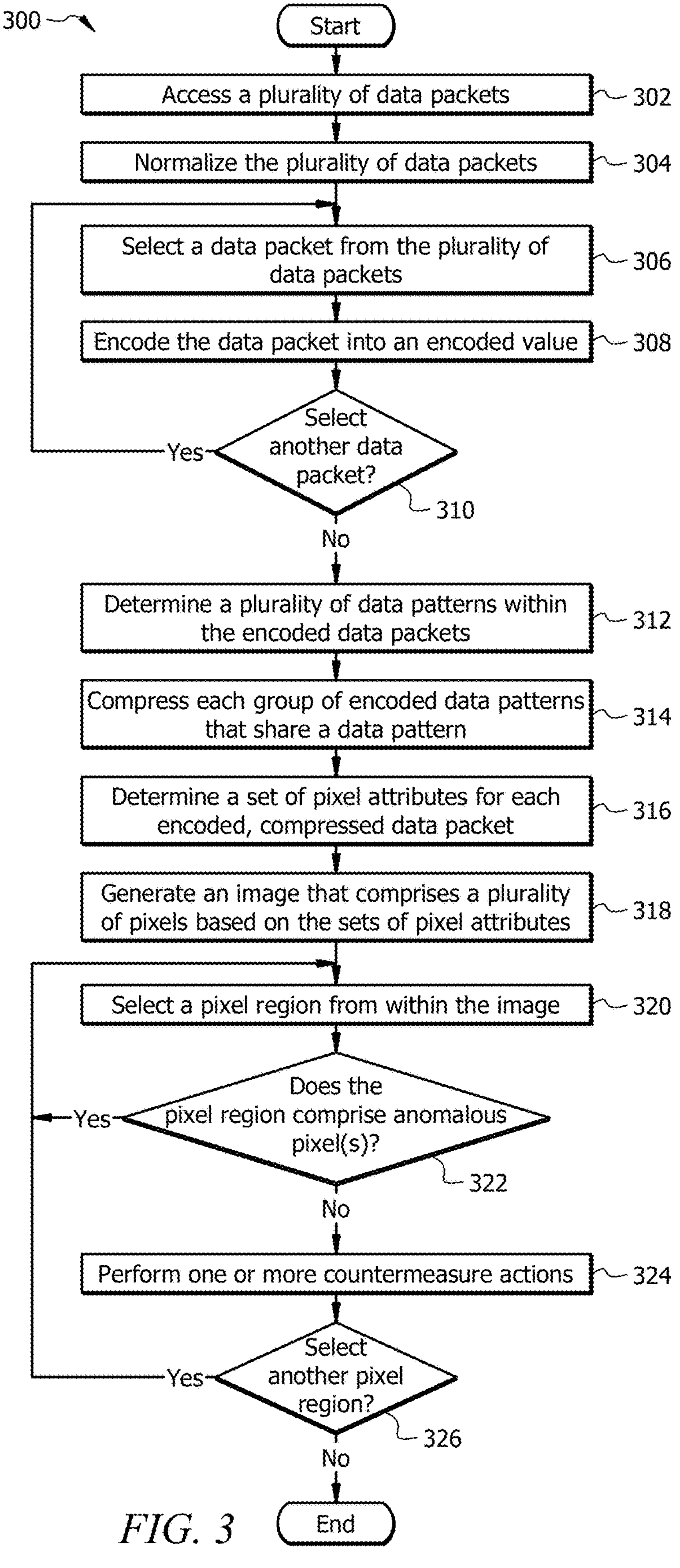
FIG. 3 illustrates an example flow chart of a method of the system of FIG. 1 to transform network data packets into pixels for pattern analysis and data packet anomaly detection and mitigation.

As described above, previous technologies fail to provide efficient and reliable solutions to transform network data packets into image pixels for pattern analysis and data packet anomaly detection and mitigation. Embodiments of the present disclosure and its advantages may be understood by referring to FIGS. 1 through 3. FIGS. 1 through 3 are used to describe systems and methods to transform network data packets into image pixels for pattern analysis and data packet anomaly detection and mitigation, according to some embodiments.

System Overview

FIG. 1 illustrates an embodiment of a system 100 that is generally configured to transform network data packets into image pixels for pattern analysis and data packet anomaly detection and mitigation. In some embodiments, the system 100 comprises a server 140 communicatively coupled with one or more computing devices 120 and one or more storage databases 130 via a network 110. The network 110 enables the communication among the components of the system 100. Each of the computing devices 120 may be used to communicate with other components of the system 100. Each of the storage databases 130 is configured to store information that may be used by other components of the system 100. The server 140 is configured to encode the network data packets 104, compress the encoded network data packets 104 based on detected common data patterns 210 across the encoded network data packets 104, transform each encoded, compressed network data packet 104 into a respective pixel 224, where the attributes of the data packet 104 are embedded into the respective pixel 224, and generate an image 15 with the generated pixels 224, where the image 150 visually represents trends of data packets 104 with respect to time. Therefore, the data packets 104 are transformed into an encoded and compressed visual representation. In other embodiments, system 100 may not have all of the components listed and/or may have other elements instead of, or in addition to, those listed above.

In general, the disclosed system 100 provides technological improvements to conventional techniques for network data packet pattern analysis and data packet anomaly and mitigation techniques.

Conventional systems typically store and analyze the raw format of network data packets. The analysis and storage of the network data packets in raw format consumes a lot of computational and memory resources and therefore are inefficient in terms of computational resource utilization and memory resource utilization. Further, analyzing the raw format of network data packets using legacy conventional algorithms is not sufficient to derive and extract meaningful insight from the analysis, at least because data patterns and trends within and among the data packets may be lost to the legacy conventional algorithms, for example, due to the increased complexity in the content of data packets. Further, conventional systems are unable to detect data patterns and trends across different data packet types (e.g., different data structures or schema) or to provide meaningful insight from the data packets for anomaly detection and mitigation. For example, if some data packets include content with different data schemas, such as extensible markup language (XML) and JavaScript object notation (JSON), conventional systems are not configured to compare such different formats with each other to draw correlations or patterns.

The disclosed system is configured to provide a technical solution to these and other technical problems in network communication pattern analysis, and data packet anomaly detection and mitigation techniques. The technical advantages and improvements over the conventional techniques are described below in conjunction with certain embodiments of the disclosed system.

In some embodiments, the disclosed system 100 implements an unconventional method for data packet representation and analysis by encoding, compressing, and transforming the data packets 104 into image pixels 224 that visually represent the data packets 104. In some embodiments, the disclosed system 100 is configured to implement an unconventional encoding algorithm 152 that is configured to dynamically encode the data packets 104 by adjusting the encoding parameters based on the attributes 160 of the network data packet 104. For example, the encoding parameters may depend on the attributes 160, including, but not limited to, data structure, size, type, geographic location, time of communication in a network, and other attributes of the data packets 104. Therefore, the disclosed system 100 implements a dynamic encoding process configured for each group of network data packet 104 that share one or more common attributes 160 unlike conventional encoding systems where a one-size-fit-all encoding process is used and therefore is rigid and not flexible. Some of the technical advantages of the dynamic encoding process include implementing an attribute-specific encoding process that maintains relevant information of the data packets 104 which would be lost if a fixed encoding process were applied to all data packets with different attributes. For example, using the attribute-specific encoding process, the key-value pairs in the JSON data packets, and tags and elements of the XML data packets are captured and encoded according to their respective attributes.

In some embodiments, the disclosed system 100 is configured to implement an unconventional compressing algorithm 154 that is configured to recursively identify repeating structures 218 within the network data packets 104 and replace each identified repeating structure 218 with a corresponding compressed representation 220. Further, the depth of the recursive process to identify repeating structures within a given repeating structure is controlled by a dynamic threshold 222 which determines the level of granularity for identifying and compressing repeating structures. The dynamic threshold is adjusted based on the desired tradeoff between compression ratio and maintaining details in the compressed data packets. For example, a higher dynamic threshold may lead to a higher compression ratio, where some detail may be lost, and a lower dynamic threshold may lead to a lower compression ratio and save more detail in the data packets.

In some embodiments, the disclosed system 100 is configured to generate an image 150 with pixels 224, where each pixel 224 is a visual representation of a respective encoded, compressed data packet 104. The disclosed system 100 may extract or derive meaningful insight from the image 150, such as the trends in various portions of the image, whether there are any outlier or anomalous pixels 224 (and thus anomalous network packet 104), among others. For example, if a pixel 224 representing a network packet 104 does not have the same or substantially similar color or color intensity compared to its adjacent pixels, it may be an indication that the corresponding network packet 104 is anomalous. In response, the disclosed system 100 may mitigate the anomalous data packet 104 by performing countermeasure actions 240, such as appending the data packet with an additional header field as indicating anomalous and communicating an alert message that indicates that the data packet is anomalous, among others.

Accordingly, the disclosed system provides the practical applications of improving data packet pattern representation and analysis by encoding, compressing, and transforming the data packets 104 into image pixels that visually represent the data packets 104.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wi-Fi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may include fiber optics, optical fibers, and the like to implement quantum communication channels. The network 110 may be configured to support any suitable type of communication protocol as would be appreciated by one of ordinary skill in the art.

Example Computing Device

Each computing device 120 may generally be any device that is configured to process data and interact with users. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users.

Each computing device 120 may include a hardware processor, memory, and/or circuitry configured to perform any of the functions or actions of the computing device 120 described herein. For example, the computing device 120 includes a processor in signal communication with a network interface and a memory. The memory stores software instructions (e.g., code) that, when executed by the processor, cause the processor to perform one or more operations of the computing device 120 described herein. The users 102 may use the computing devices 120 to communicate data packets 104 with other computing devices 120, entities, organizations that provide certain services to their users, etc. Some examples of the users 102 may include people, organizations, among others. In some examples, a user 102 associated with an organization may send a request 106 to the server 140 to encode and compress a set of data packets 104 associated with the users of the organization and generate an image 150 to represent the data packets 104. In response to the request 106, the server 140 may initiate the requested operations. These operations are described in greater details in conjunction with the operational flow of the system 100 described in FIG. 2.

Example Storage Database

The storage database 130 may include any storage architecture configured to store data and communicate with other computing devices. Examples of the storage database 130 include, but are not limited to, a data warehouse, a network-attached storage cloud, a storage area network, and a storage assembly directly (or indirectly) coupled to one or more components of the system 100. The storage database 130 may include a plurality of databases storages in one or more data centers at one or more geographic locations where they form a distributed network of databases.

The storage database 130 is configured to store data packets 104. Each data packet 104 may include several layers, where each layer is configured to store a specific information. In some examples, a data packet 104 may include a first layer that contains a physical medium access control (MAC) address. The first layer may include a second layer that contains a logical internet protocol (IP) address. The second layer may include a third layer that contains port number, such as transmission control protocol (TCP) and/or user datagram protocol (UDP) ports. The third layer may include one or more layers that include the content, such as hypertext transfer protocol (HTTP), file transfer protocol (FTP), domain name system (DNS), etc. In the same or other examples, a data packet 104 may include some of these layers and/or additional layers. The data packet 104 may include content in any suitable data structure or schema, such as JSON, XML, Binary JSON (BSON), among others. Some examples of the data packets 104 may include, but are not limited to, user interaction data that indicates an interaction between two or more users 102, user input data, user credentials, system files, documents, multimedia files (e.g., images, videos, audio files), text-based data, such as electronic mails (e-mails), phone text messages, software application log files, network communication records (e.g, details of data transfers, data routes in a network), or any other type of data packets that can be transmitted via the network 110.

Each data packet 104 may be communicated in the network 110 from one or more computing device 120 to one or more another computing device 120. Each data packet 104 may have a specific data pattern 210 that may indicate the type of the data packet 104. In some examples, a data pattern 210 of a data packet 104 (e.g., indicating data packet types 216) may include an application programming interface (API) request, an API response, an HTTP request, a structured query language (SQL) query, a webhook, among other types. In some examples, a data pattern 210 of a data packet 104 may indicate content of the data packet 104, such as a data transfer from a kiosk to a user 102, an online shopping, an in-store shopping session, withdrawals, deposits, among others. In some examples, a data pattern 210 of a data packet 104 may indicate a data structure or data schema of the data packet 104, such as JSON, XML, BSON, etc.

Example Server

The server 140 generally includes a hardware computer system configured to encode the network data packets 104, compress the network data packets 104 based on detected common data patterns 210 across the network data packets 104, transform each encoded, compressed network data packet 104 into a respective pixel 224, where the attributes of the data packet 104 are embedded into the pixel 224, and generate an image 150 with the generated pixels, where the image 150 visually represents trends of data packets 104 with respect to time.

In some embodiments, the server 140 may be implemented by a cluster of computing devices, such as virtual machines. For example, the server 140 may be implemented by a plurality of computing devices using distributed computing and/or cloud computing systems in a network. In some embodiments, the server 140 may be configured to provide services and resources (e.g., data and/or hardware resources as described herein, etc.) to other components and devices.

The server 140 may comprise a processor 142 operably coupled with a user interface 143, a network interface 144, and a memory 146. The processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the server 140 described herein. In this way, the processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-3. For example, the processor 142 may be configured to perform one or more operations of the operational flow 200 as described in FIG. 2 and one or more operations of the method 300 as described in FIG. 3.

The user interface 143 may include interfaces, such as a display screen, a microphone, a keypad, and/or other appropriate terminal equipment usable by users. The users may interact with the server 140 via the user interfaces 143.

The network interface 144 is configured to enable wired and/or wireless communications. The network interface 144 may be configured to communicate data between the server 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise read-only memory (ROM), random-access memory (RAM), ternary content-addressable memory (TCAM), dynamic random-access memory (DRAM), and/or static random-access memory (SRAM). The memory 146 may include one or more of a local database, a cloud database, a network-attached storage (NAS), etc. The memory 146 comprises one or more disks, tape drives, or solid-state drives, and may be used as an overflow data storage device to store programs when such programs are selected for execution, and to store instructions and data that are read during program execution. The memory 146 may store any of the information described in FIGS. 1-3 along with any other data, instructions, logic, rules, or code operable to implement the function(s) described herein when executed by processor 142. For example, the memory 146 may store software instructions 148, images 150, encoding algorithm 152, compression algorithm 154, image generating algorithm 156, training dataset 158, data packet attributes 160, pixel attributes 162, data patterns 210, encoded value 214, pixels 224, countermeasure actions 240, and/or any other data or instructions. The software instructions 168 may comprise any suitable set of instructions, logic, rules, or code operable to execute the processor 142 and perform the functions described herein, such as some or all of those described in FIGS. 1-3.

The encoding algorithm 152 may be implemented by the processor 142 executing the software instructions 148, and is generally configured to encode each data packet 104 into a respective encoded value 214, where the encoded value 214 may represent a unique transformation of the respective data packet 104. In some embodiments, the encoding algorithm 152 may include a pliable multiscale encoding (PME) algorithm that implements the principles of multiscale encoding which represents a significant advancement in the field of data encoding, offering a more flexible, scalable, and effective approach to handling and analyzing large and complex datasets. The encoding algorithm 152 provides adaptability and flexibility in encoding data. Unlike traditional encoding methods that are rigid, the PME algorithm may adjust its encoding parameters dynamically based on the attributes 160 of the data packets 104 to provide a more optimal representation and compression.

The encoding algorithm 152 operates on multiple scales or resolutions, enabling it to capture both fine-grained details and broader patterns within the data packets 104. The multiscale approach is particularly beneficial for complex datasets of data packets 104 with varying attributes 160, where different levels of granularity may be required for different analytical purposes.

The encoding algorithm 152 encodes the data packets 104 into a more compact and efficient format. However, encoding algorithm 152's encoding process is improved by its pliable and multiscale nature, allowing for more sophisticated and tailored data representations. For example, the encoding algorithm 152 may encode data packets 104 by identifying self-similar patterns within the data packets 104 and representing them using a multiscale formula, such as: $F(x)=a.x^n+b.x+c$, where F (x) represents the fractal pattern, x values represent the data packets 104, and the a, b, c, and n values are constants that define the specific shape and characteristics of the fractal formula. The encoding parameters of the encoding algorithm 152 may include the variables of the polynomial formula, including a, b, c, and n. For example, the polynomial formula may be used to encode the self-similar patterns 210 in the data packets 104.

In some embodiments, the encoding algorithm 152 may normalize the data packets 104 by scaling the data packets 104 to a common range or format, making it easier to compare and analyze. For example, in some cases where each subset of the plurality of data packets 104 is received from a different data source, such as different organizations, different computing devices 120, etc., the encoding algorithm 152 may normalize the plurality of data packets 104 on a predefined scale, such as 0 to 100, 1 to 10, or the like.

In some embodiments, the encoding algorithm 152 may update or transform the format (e.g., data structure or data schema) of one or more data packets 104 into another, desired data format. In this process, the encoding algorithm 152 may implement a natural language processing machine learning algorithm, neural networks with a plurality of neuron arrays arranged in layers, that is trained to identify the data structure of a given data packet 104 and convert (translate or transform) it to a desired data structure. For example, if a data packet 104 is in XML data structure and the desired data structure is JSON, the encoding algorithm 152 may reconstruct the data packet 104 with JSON format. The desired data structure may be the data structure that the encoding algorithm 152 is trained to convert other data structures to. In some embodiments, the encoding algorithm 152 may implement an object oriented programing code that is configured to detect the components (e.g., key and value pairs, etc.) of a given data structure sand convert them to counterpart components in the desired data structure.

The encoding algorithm 152 may determine different self-similar patterns 210 in the normalized data packets 104. Self-similarity may mean certain parts of the data packets 104 may resemble the whole, but at a smaller scale. In other words, the encoding algorithm 152 may determine repeating data patterns 210 among the data packets 104. When self-similar patterns are identified, the encoding algorithm 152 may represent these patterns using a multiscale formula, such as a polynomial equation described above, where the constant values may be configured based on the size, content, type, and other attributes of the data set of the data packets 104 in question. For example, self-similar patterns 210 may include the key-value pairs in the JSON data packets 104, tags and elements of the XML data packets 104, among others in any data structure. The compression algorithm 154 may be implemented by the processor 142 executing the software instructions 148 and is generally configured to compress the data packets 104 into a compressed format. In some embodiments, the compression algorithm 154 may be implemented by a recursive similarity compression (RSC) algorithm where compression algorithm 154 may determine data patterns 210 within patterns 210. In this process, the compression algorithm 154 may identify smaller parts of the dataset of the data packets 104 that resemble the larger whole, and this process is repeated at multiple levels or scales. By identifying these recursive self-similar patterns 210, the compression algorithm 154 may compress the data packets 104 even further due to the use of same multiscale formula to represent larger and smaller parts of the data packets 104, reducing the amount of information needed to describe the entire dataset of the data packets 104. Thus, the compression algorithm 154 may result in a higher compression ratio, meaning the compressed data packets 104 may take even less memory space while still retaining the essential information. This makes it more efficient to store and transmit the data packets 104 as they require less memory space and network bandwidth.

In some embodiments, the compression algorithm 154 may be implement a dynamic threshold in the RSC algorithm. The dynamic threshold is a flexible limit that determines how deep the process of recursion goes when searching for self-similar patterns 210 in the data packets 104. When applying the compression algorithm 154 to the data packets 104, the compression algorithm 154 searches for patterns 210 within patterns 210. The dynamic threshold determines how many levels deep the search may go. For example, if the dynamic threshold is set to three, the compression algorithm 154 may search for self-similar patterns 210 at three different scales or levels of the data packets 104. The dynamic threshold helps balance the level of compression with the quality and usability of the compressed data packets 104.

The image generating algorithm 156 may be implemented by the processor 142 executing the software instructions 148 and is generally configured to generate images 150 where the pixels 224 represent the associated data packets 104. In some embodiments, the image generating algorithm 156 may comprise a support vector machine, neural networks, random forest, k-means clustering, etc. The image generating algorithm 156 may be implemented by a plurality of neural network layers, convolutional neural network layers, Long-Short-Term-Memory (LSTM) layers, Bi-directional LSTM layers, recurrent neural network layers, and the like. In some embodiments, the image generating algorithm 156 may implement a natural language processing machine learning algorithm, text processing machine learning algorithm, image processing algorithm, among others.

In some embodiments, the image generating algorithm 156 may be implemented by unsupervised, semi-supervised, or supervised machine learning techniques. For example, the image generating algorithm 156 may be trained by a training dataset 158 that includes annotated samples of data packets 104, each labeled with a set of data packet attributes 160. The set of data packet attributes 160 may include type, content, timestamp of communication in the network 110, network data path along the computing devices 120, and data structure, among others.

In the training process, the image generating algorithm 156 may be provided with annotated samples of data packets 104 from the training dataset 158 to learn the association between each data packet sample and its respective set of data packet attributes 160. In this process, the image generating algorithm 156 may extract features from each annotated data packet sample, such as its type, content, timestamp of communication, network data path along the computing devices 120, and data structure, among others. The extracted features may be represented by an embedding feature vector in a three-dimensional vector space. The image generating algorithm 156 may learn to associate the respective features with the given label. In this process, the image generating algorithm 156 may use feature extraction, text segmentation and tokenization, and/or mapping of data packet attributes 160 to pixel attributes 162.

The pixel attributes 162 may include pixel color, pixel color intensity, and pixel location. The pixel color is associated with the type of a respective data packet 104 (which may be encoded and compressed by the encoding algorithm 152 and compression algorithm 154). The pixel color intensity is associated with a value of the content within the respective data packet 104 (which may be encoded and compressed by the encoding algorithm 152 and compression algorithm 154). The pixel location is associated with the timestamp of communication of the respective data packet 104 (which may be encoded and compressed by the encoding algorithm 152 and compression algorithm 154). The image generating algorithm 156 may determine the set of pixel attributes 162 for each pixel that represents the respective encoded, compressed data packet 104 based on the mapping between each pixel attribute 162 and the respective data packet attribute 160. The image generating algorithm 156 may use this information to determine pixel attributes 162 for testing and/or previously unseen (or upcoming) data packets 104.

In the testing process, the image generating algorithm 156 is given an unlabeled data packet 104 and is asked to generate a pixel representation for the data packet 104. In response, the image generating algorithm 156 may analyze the data packet 104 by extracting its features (e.g., data packet attributes 160), such as its type, content, timestamp of communication, data structure, and network path among computing devices 120. In response, the image generating algorithm 156 may transform these features into corresponding pixel attributes 162 by implementing the learned information from the training process. For example, the image generating algorithm 156 may determine the pixel color based on the extracted type of the data packet 104, the pixel color intensity based on the value of the content of the respective data packet 104, and the pixel location based on the timestamp of communication and type of the data packet 104. For example, the image generating algorithm 156 may determine the pixel color based on the extracted type of the data packet 104, such as assigning a Red-Green-Blue (RGB) value of (25, 6, 55) for one type and (3, 255, 6) for another type, the pixel color intensity based on the value of the content of the respective data packet 104, such as a brightness value ranging from 0 (dark) to 255 (bright) proportional to the value of the content of the respective data packet 104, and the pixel location based on the timestamp of communication and type of the data packet 104, such as mapping the timestamp to an x-coordinate and the type to a y-coordinate within the image. The image generating algorithm 156 may perform similar operations for other data packets 104, generate pixels representing the data packets 104, and generate an image 150 of the generated pixels, where each pixel corresponds to a respective data packet 104 (which may be encoded and compressed), and the pixel attributes 162 visually encode and represent the data packet attributes 160 of the data packet 104. The image generating algorithm 156 may go through epochs of backpropagation to increase the accuracy of determining pixel attributes 162 and image generating by revising and refining the parameters of its neural network, such as weight and bias values.

Operational Flow for Encrypting and Compressing the Data Packet

FIG. 2 illustrates an example operational flow 200 of system 100 (see FIG. 1) for transforming data packets into pixels according to some embodiments. In operation, the server 140 may begin the operational flow 200 when it receives a request 106 from the computing device 120 to generate an image 150 to represent the data packets 104. In response, the server 140 may perform certain operations as described herein. In some examples, the server 140 may automatically generate images 150 for the data packets 104 before they are initiated, during their communication in the network 110, and/or after they reached a destination. In some examples, the server 140 may act as a gateway that monitors the network traffic of the data packets 104 among the computing devices 120 via the network 110. In response, the server 140 may access and process them as described herein. In some examples, the network data packets 104 may be stored in the storage databases 130 and the server 140 may retrieve the data packets 104 from the databases 130 to access and process them as described herein.

Encoding the Data Packets

In some embodiments, the server 140 may implement the encoding algorithm 152 to encode the data packet 104, similar to that described in FIG. 1. In this process, the encoding algorithm 152 may encode each data packet 104 into a respective encoded value 214, where a given encoded value 214 may represent a unique transformation of the respective data packet 104. For example, an encoded value 214 may be an output of a polynomial function such as: $F(x)=a.x^n+b.x+c$, where the output of the function F (x) represents the encoded value 214 of a respective data packet 104 represented by x value, and the a, b, c, and n values are constants that define the specific shape and characteristics of the polynomial function. For example, the encoding algorithm 152 may convert the data packet **104*a* into the encoded value 214 at though the data packet 104*b* into the encoded value 214*b*. In the encoding process, the encoding algorithm 152 may determine the data patterns 210 within the data packets 104, where each data pattern 210 may indicate a respective data packet type 216**.

Compressing the Data Packets

In some embodiments, the server 140 may compress the encoded data packets **104*a-b* (e.g., encoded values 214*a-b*) by implementing the compression algorithm 154, similar to that described in FIG. 1. For example, the compression algorithm 154 may identify each group of encoded data packets 104 (e.g., encoded values 214) that share a data pattern 210. In response, the compression algorithm 154 may compress each group of encoded data packets 104 (e.g., encoded values 214) that share a common data pattern 210**.

In some embodiments, the compression process by the compression algorithm 154 may be recursive, similar to that described in FIG. 1. For example, the compression algorithm 154 may analyze the encoded data packet **104*a-b* (e.g., encoded values 214*a-b*) and identify a first repeating structure 218***a* within the plurality of encoded data packets 14*a-n*. The first repeating structure 218*a* may be, for example, a recurring sequence of header fields, a repeated pattern in the content within the encoded data packets 104*a-b* and/or a common data structure. In response, the compression algorithm 154 may compress the content with the first repeating structure 218*a* into the first compressed representation 220*a*, e.g., replace the first repeating structure 218*a* with a first compressed representation 220*a*. The compression algorithm 154 may recursively analyze the first compressed representation 220*a* to identify one or more additional repeating structures 218*b-n* within the first compressed representation 220*a*. In response, the compression algorithm 154 may compress the content with each repeating structure 218*b-n* into a corresponding compressed representation 220*b-n*, e.g, replacing each of the one or more additional repeating structures 218*b-n* with a corresponding compressed representation 220*b-n*. The repeating structure 218*a-n* may have an overlapping repeating structure.

The level of the recursive compression process may be set by the dynamic threshold 222, similar to that described in FIG. 1. In the illustrated example in FIG. 2, the dynamic threshold 222 is configured to two and thus, the two levels of the recursive compression process are shown, where at level one, the first repeating structure 218*a* is identified and compressed, and at level two, the second one or more repeating structures 218*b-n* are identified and compressed. The present disclosure contemplates that the dynamic threshold 222 may be configured to be any suitable value according to the compression and data retention requirements.

Generating an Image for the Data Packets

In some embodiments, the server 140 may implement the image generating algorithm 156 to generate images 150 for the encoded and compressed data packets 104. The encoded and compressed data packets 104 may be the output of the encoding algorithm 152 and the compression algorithm 154. In some embodiments, the encoded and compressed data packets 104 may be partitioned to be represented by multiple images 150. For example, the encoded and compressed data packets 104 may be divided in the groups of fifty, a hundred, five hundred, etc, and each group may be represented by a different image 150.

The image generating algorithm 156 may determine a set of pixel attributes 162 for each encoded and compressed data packet 104, similar to that described in FIG. 1. In this process, the image generating algorithm 156 may analyze each encoded and compressed data packet 104 by extracting its data packet attributes 160 (e.g., features), such as its type, content, timestamp of communication, data structure, and network path among computing devices 120. The extracted data packet attributes 160 may be mapped to pixel attributes 162 based on the learned associations from the training process using the training dataset 158 (see FIG. 1). For example, the image generating algorithm 156 may determine the pixel color based on the extracted type of the data packet 104, the pixel color intensity based on the value of the content within the respective data packet 104, and the pixel location based on the timestamp of communication and type of the data packet 104. The pixel location may include an x-axis position associated with the timestamp of the respective compressed, encoded data packet 104 and a y-axis position associated with the type of the respective compressed, encoded data packet 104. The image generating algorithm 156 may use the determined pixel attributes 162 to generate a pixel 224 that visually encodes the respective data packet 104.

The image generating algorithm 156 may perform similar operations for each data packet 104*a* through 104*b* within a plurality of encoded and compressed data packets 104*a-b* to generate the pixels 224*a-b*, respectively. For example, the image generating algorithm 156 may determine the pixel attributes 162*a* based on the data packet attributes 160*a* of the first encoded, compressed data packet 104*a* and generate the first pixel 224*a* and determine the pixel attributes 162*b* based on the data packet attributes 160*b* of the second encoded, compressed data packet 104*b* and generate the second pixel 224*b*.

The image generating algorithm 156 may assemble the generated pixels 224*a* through 224*b* according to the pixel locations to generate the image 150 that comprises the pixels 114*a-b*. The generated image 150 may visually represent the trends of the data packets 104 (e.g., in encoded and compressed form) with respect to time. For example, the x-axis on the image 150 may represent time (t) and the y-axis on the image 150 may represent the data packet types 216. The colors, color intensities, and positions of the pixels 224 may be used to determine the trends and patterns of the data packet 104. The server 140 may generate and display the image 150 on the display interface included in the user interface 143. The server 140 may communicate the image 150 to any of the computing devices 120 from which a request to communicate the image 150 is received. In response, the image 150 may be displayed on the display screen of the receiving computing device 120.

Detecting and Mitigating Anomalous Data Packets

In some embodiments, the server 140 (e.g., image generating algorithm 156) may evaluate the image 150 to determine whether any of the pixels 224 (and thus the associated data packets 104) is anomalous. In this process, the server 140 may determine whether each pixel region 228 within the image 150 is anomalous, where each pixel region 228 may include one or more adjacent pixels 224. In this process, the server 140 may apply a sliding pixel window 226 over the image 150 to evaluate each pixel region 228. The server 140 may move the sliding pixel window 226 across the image 150 as shown in FIG. 2, similar to a kernel in a convolutional operation. For each pixel region 228, the server 140 may compare the pixel region 228 with each of one or more training pixel regions 230 that is labeled as anomalous. Each training pixel regions 230 may be associated with data packet associated with an anomaly, such as, unauthorized access attempts, content associated with previously known malware, etc. For example, each of the one or more training pixel regions 230 may display outlier pixel(s), where the color and/or position of an anomalous pixel does not follow the adjacent pixels.

In comparing the pixel region 228 with a training pixel region 230 that is labeled as anomalous, the server 140 may generate a first embedding vector 232 representing a first set of pixel attributes 160 associated with the pixel region 228 and generate a second embedding vector 234 representing a second set of pixel attributes 160 associated with the training pixel region 230. In response, the server 140 may compare the first embedding vector 232 with the second embedding vector 234 in the vector space 202. The server 140 may determine a distance 236 (e.g., Euclidean distance) between the first embedding vector 232 and the second embedding vector 234 in the vector space 202. If the distance 236 is less than a predefined threshold distance (e.g., less than 0.1, 0.2, etc.), the server 140 may determine that the pixel region 228 is anomalous. In response, the server 140 may determine the corresponding data packet(s) 104 is anomalous. Otherwise, the server 140 may determine that the pixel region 228 (and thus the corresponding data packet(s) 104) is not anomalous. The anomalous pixel region 228 may represent a security breach at one or more data packets 104 represented by the one or more adjacent pixels 224 within the pixel region 228.

In response to determining that the pixel region 228 within the image 150 is anomalous, the server 140 may perform one or more countermeasure actions 240. The countermeasure actions 240 may include appending the anomalous data packets 104 with an additional header field as indicating anomalous, communicating an alert message that indicates that the identified data packets 104 are anomalous, updating the associated pixels 224 to indicate the anomaly, such as adding an alert icon, text statement, a popup text bubble/icon, and visual representation of an alert message, among others, linked to and/or next to each associated pixel 224.

Method for Transforming Data Packets into Pixels

FIG. 3 illustrates an example flowchart of a method 300 for transforming data packets 104 into pixels 224 according to some embodiments. Modifications, additions, or omissions may be made to method 300. Method 300 may include more, fewer, or other operations. For example, operations may be performed in parallel or in any suitable order. While at times it is discussed that the system 100, computing devices 120, server 140, or components of any of thereof perform some operations, any suitable system or components of the system may perform one or more operations of the method 300. For example, one or more operations of method 300 may be implemented, at least in part, in the form of software instructions 148 of FIG. 1, stored on a tangible non-transitory machine-readable medium (e.g., memory 146 of FIG. 1) that when run by one or more processors (e.g., processor 142 of FIG. 1) may cause the one or more processors to perform operations 302-326.

At operation 302, the server 140 accesses a plurality of data packets 104, similar to that described in FIGS. 1-2.

At operation 304, the server 140 normalizes the plurality of data packets 104. For example, the server 140 may implement the encoding algorithm 152 to normalize the data packets 104, similar to that described in FIGS. 1-2.

At operation 306, the server 140 selects a data packet 104 from the plurality of data packets 104. The server 140 iteratively selects a data packet 104 if at least one data packet 104 is left for evaluation.

At operation 308, the server 140 encodes the data packet 104 into an encoded value 214. For example, the server 140 may implement the encoding algorithm 152 to encode the data packet 104 into the encoded value 214, similar to that described in FIGS. 1-2.

At operation 310, the server 140 determines whether to select another data packet 104. The server 140 may determine to select another data packet 104 if at least one data packet 104 is left for evaluation. If it is determined that another data packet 104 is left for evaluation, the method 300 returns to operation 306. Otherwise, the method 300 proceeds to operation 312.

At operation 312, the server 140 determines a plurality of data patterns 210 within the encoded data packets 104. For example, the server 140 may implement the encoding algorithm 152 and/or compression algorithm 154 to determine the data patterns 210 within the encoded data packets 104, similar to that described in FIGS. 1-2.

At operation 314, the server 140 compresses each group of encoded data packets 104 that share a data pattern 210. For example, the server 140 may implement the compression algorithm 154 to identify and compress each group of encoded data packets 104 that share a data pattern 210, similar to that described in FIGS. 1-2.

At operation 316, the server 140 determines a set of pixel attributes 162 for each encoded, compressed data packet 104. For example, the server 140 may implement the image generating algorithm 156 to determine the set of pixel attributes 162 for each encoded, compressed data packet 104, similar to that described in FIGS. 1-2.

At operation 318, the server 140 generates an image 150 that comprises a plurality of pixels 224 based on the sets of pixel attributes 162. The server 140 may display the image 150 on the display screen of the server 140 and/or communicate the image 150 to any computing devices 120, similar to that described in FIGS. 1-2.

At operation 320, the server 140 selects a pixel region 228 from within the image 150. The server 140 may iteratively select a pixel region 228 until no pixel region 228 is left for evaluation.

At operation 322, the server 140 determines whether the pixel region 228 comprises anomalous pixel(s) 224, similar to that described in FIGS. 1-2. If it is determined that the pixel region 228 comprises anomalous pixels(s) 224, the method 300 may proceed to operation 324. Otherwise, the method 300 may return to operation 320.

At operation 324, the server 140 performs one or more countermeasure actions 240, similar to that described in FIGS. 1-2.

At operation 326, the server 140 determines whether to select another pixel region 228. For example, the server 140 may divide the image 150 into pixel regions 228 and iteratively evaluate each pixel region 228. If it is determined that no pixel region 228 is left for evaluation, the method 300 ends. Otherwise, the method 300 returns to operation 320.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112 (f), as it exists on the date of filing hereof, unless the words "means for" or "step for" are explicitly used in the particular claim.

The invention claimed is:

1. A system comprising:

a network interface configured to receive a plurality of data packets, wherein each data packet is associated with a set of data packet attributes comprising at least one of a type, content, or a timestamp of communication in a network; and a processor, operably coupled to the network interface, and configured to:

encode each data packet from among the plurality of data packets into a respective encoded value, wherein a given encoded value represents a unique transformation of a respective data packet;

identify a plurality of data patterns within the plurality of encoded data packets, wherein each data pattern indicates a respective data packet type;

compress each group of encoded data packets that share a data pattern into a compressed format;

for each encoded, compressed data packet, determine a set of pixel attributes for a pixel based, at least in part, upon the set of data packet attributes, wherein the set of pixel attributes comprises:

a pixel color, wherein the pixel color is associated with the type of a respective encoded, compressed data packet;

a pixel color intensity, wherein the pixel color intensity is associated with a value of the content within the respective encoded, compressed data packet; and a pixel location, wherein the pixel location is associated with the timestamp of communication of the respective encoded, compressed data packet; and generate, based, at least in part, upon the set of pixel attributes, an image comprising a plurality of pixels, wherein:

each pixel indicates a given encoded, compressed data packet; and the image visually represents a trend of the plurality of data packets with respect to time.

2. The system of claim 1, wherein the pixel location comprises:

an x-axis position associated with the timestamp of the respective compressed, encoded data packet, and a y-axis position associated with the type of the respective compressed, encoded data packet.

3. The system of claim 1, wherein the processor is further configured to:

determine that a pixel region within the image is anomalous, wherein:

the pixel region comprises one or more adjacent pixels;

the anomalous pixel region represents a security breach at one or more data packets represented by the one or more adjacent pixels within the pixel region; and in response to determining that the pixel region within the image is anomalous, perform one or more countermeasure actions.

4. The system of claim 3, wherein the one or more countermeasure actions comprise appending the one or more data packets with an additional header field as indicating anomalous or communicating an alert message that indicates that the one or more data packets are anomalous.

5. The system of claim 3, wherein determining that the pixel region within the image is anomalous comprises:

applying a sliding pixel window over the image to evaluate each pixel region; and comparing the pixel region with a training pixel region that is labeled as anomalous, comprising:

generating a first embedding vector representing a first set of pixel attributes associated with the pixel region;

generating a second embedding vector representing a second set of pixel attributes associated with the training pixel region;

comparing the first embedding vector with the second embedding vector in a vector space; and determining that a distance between the first embedding vector and the second embedding vector in the vector space is less than a threshold distance.

6. The system of claim 1, wherein the plurality of data patterns comprises at least one of the following:

an application programming interface (API) request;

an API response;

a hypertext transfer protocol (HTTP) request;

a structured query language (SQL) query; or a webhook.

7. The system of claim 1, wherein:

each subset of the plurality of data packets is received from a different data source, and the processor is further configured to convert the plurality of data packets to a configured data structure.

8. A method comprising:

encoding each data packet from among a plurality of data packets into a respective encoded value, wherein a given encoded value represents a unique transformation of a respective data packet, wherein each data packet is associated with a set of data packet attributes comprising at least one of a type, content, or a timestamp of communication in a network;

identifying a plurality of data patterns within the plurality of encoded data packets, wherein each data pattern indicates a respective data packet type;

compressing each group of encoded data packets that share a data pattern into a compressed format;

for each encoded, compressed data packet, determining a set of pixel attributes for a pixel based, at least in part, upon the set of data packet attributes, wherein the set of pixel attributes comprises:

a pixel color, wherein the pixel color is associated with the type of a respective encoded, compressed data packet;

a pixel color intensity, wherein the pixel color intensity is associated with a value of the content within the respective encoded, compressed data packet; and a pixel location, wherein the pixel location is associated with the timestamp of communication of the respective encoded, compressed data packet; and generating, based, at least in part, upon the set of pixel attributes, an image comprising a plurality of pixels, wherein:

each pixel indicates a given encoded, compressed data packet; and the image visually represents a trend of the plurality of data packets with respect to time.

9. The method of claim 8, wherein the pixel location comprises:

an x-axis position associated with the timestamp of the respective compressed, encoded data packet, and a y-axis position associated with the type of the respective compressed, encoded data packet.

10. The method of claim 8, further comprising:

determining that a pixel region within the image is anomalous, wherein:

the pixel region comprises one or more adjacent pixels; and the anomalous pixel region represents a security breach at one or more data packets represented by the one or more adjacent pixels within the pixel region; and in response to determining that the pixel region within the image is anomalous, performing one or more countermeasure actions.

11. The method of claim 10, wherein the one or more countermeasure actions comprise appending the one or more data packets with an additional header field as indicating anomalous or communicating an alert message that indicates that the one or more data packets are anomalous.

12. The method of claim 10, wherein determining that the pixel region within the image is anomalous comprises:

applying a sliding pixel window over the image to evaluate each pixel region; and comparing the pixel region with a training pixel region that is labeled as anomalous, comprising:

generating a first embedding vector representing a first set of pixel attributes associated with the pixel region;

generating a second embedding vector representing a second set of pixel attributes associated with the training pixel region;

comparing the first embedding vector with the second embedding vector in a vector space; and determining that a distance between the first embedding vector and the second embedding vector in the vector space is less than a threshold distance.

13. The method of claim 8, wherein the plurality of data patterns comprises at least one of the following:

an application programming interface (API) request;

an API response;

a hypertext transfer protocol (HTTP) request;

a structured query language (SQL) query; or a webhook.

14. The method of claim 8, wherein:

each subset of the plurality of data packets is received from a different data source, and to the method further comprises converting the plurality of data packets to a configured data structure.

15. A non-transitory computer-readable medium storing instructions that when executed by a processor, cause the processor to:

encode each data packet from among a plurality of data packets into a respective encoded value, wherein a given encoded value represents a unique transformation of a respective data packet, wherein each data packet is associated with a set of data packet attributes comprising at least one of a type, content, or a timestamp of communication in a network;

identify a plurality of data patterns within the plurality of encoded data packets, wherein each data pattern indicates a respective data packet type;

compress each group of encoded data packets that share a data pattern into a compressed format;

for each encoded, compressed data packet, determine a set of pixel attributes for a pixel based, at least in part, upon the set of data packet attributes, wherein the set of pixel attributes comprises:

a pixel color, wherein the pixel color is associated with the type of a respective encoded, compressed data packet;

a pixel color intensity, wherein the pixel color intensity is associated with a value of the content within the respective encoded, compressed data packet; and a pixel location, wherein the pixel location is associated with the timestamp of communication of the respective encoded, compressed data packet; and generate, based, at least in part, upon the set of pixel attributes, an image comprising a plurality of pixels, wherein:

each pixel indicates a given encoded, compressed data packet; and the image visually represents a trend of the plurality of data packets with respect to time.

16. The non-transitory computer-readable medium of claim 15, wherein the pixel location comprises:

an x-axis position associated with the timestamp of the respective compressed, encoded data packet, and a y-axis position associated with the type of the respective compressed, encoded data packet.

17. The non-transitory computer-readable medium of claim 15, wherein the instructions further cause the processor to:

determine that a pixel region within the image is anomalous, wherein:

the pixel region comprises one or more adjacent pixels; and the anomalous pixel region represents a security breach at one or more data packets represented by the one or more adjacent pixels within the pixel region; and in response to determining that the pixel region within the image is anomalous, perform one or more countermeasure actions.

18. The non-transitory computer-readable medium of claim 17, wherein the one or more countermeasure actions comprise appending the one or more data packets with an additional header field as indicating anomalous or communicating an alert message that indicates that the one or more data packets are anomalous.

19. The non-transitory computer-readable medium of claim 17, wherein determining that the pixel region within the image is anomalous comprises:

applying a sliding pixel window over the image to evaluate each pixel region;

comparing the pixel region with a training pixel region that is labeled as anomalous, comprising:

generating a first embedding vector representing a first set of pixel attributes associated with the pixel region;

generating a second embedding vector representing a second set of pixel attributes associated with the training pixel region;

comparing the first embedding vector with the second embedding vector in a vector space; and determining that a distance between the first embedding vector and the second embedding vector in the vector space is less than a threshold distance.

20. The non-transitory computer-readable medium of claim 15, wherein compressing each group of encoded data packets that share the data pattern comprises:

identifying a first repeating structure within the plurality of encoded data packets;

replacing the first repeating structure with a first compressed representation;

recursively analyzing the first compressed representation to identify one or more additional repeating structures within the first compressed representation; and replacing each of the one or more additional repeating structures with a corresponding compressed representation.

* * * * *